Dec. 20, 1960 R. R. PITTMAN Re. 24,915
EXCESS-VOLTAGE PROTECTIVE DEVICE
Original Filed Feb. 14, 1958
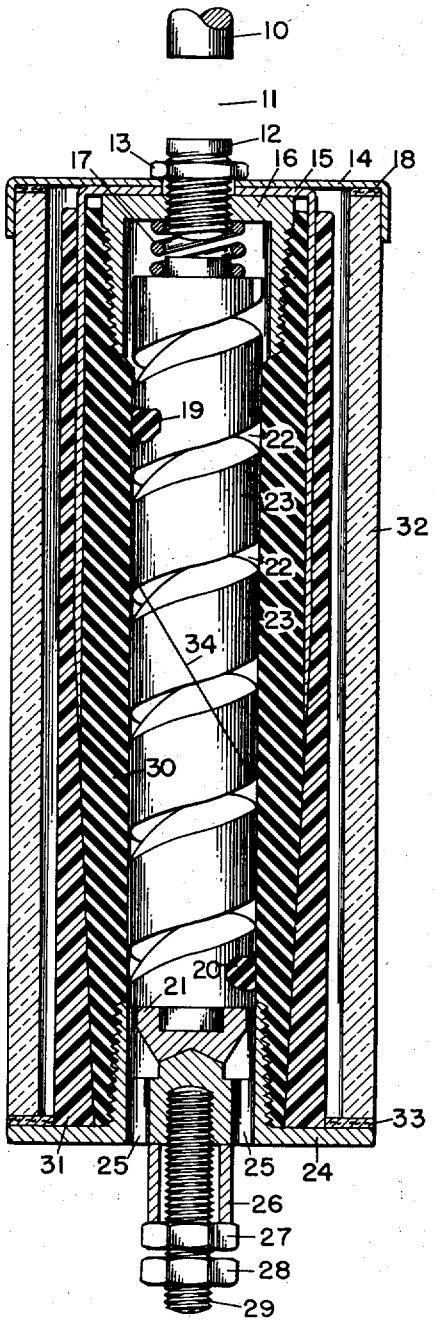
INVENTOR.
Ralph R. Pittman United States Patent Office Re. 24,915
Reissued Dec. 20, 1960

24,915

EXCESS-VOLTAGE PROTECTIVE DEVICE

Ralph R. Pittman, 5324 Southwood Road, Little Rock, Ark.

Original No. 2,883,573, dated Apr. 21, 1959, Ser. No. 715,256, Feb. 14, 1958. Application for reissue Apr. 18, 1960, Ser. No. 23,114

5 Claims. (Cl. 311—231)

Matter enclosed in heavy brackets [ ] appears in the original patent but forms no part of this reissue specification; matter printed in italics indicates the additions made by reissue.

This invention relates generally to lightning protective devices adapted for use with energized electrical circuits for the purpose of limiting the voltage rise of an associated conductor by discharging the abnormal or superimposed energy which may result from lightning strokes.

At this time there are in general use in connection with electrical distribution systems only two types of excess-voltage protective devices, sometimes called lightning arresters.

The first type is usually referred to as a "valve" type arrester, which consists of one or more spark gaps in series with a current-limiting resistance, the resistance material generally used being silicon carbide, this material having a resistance which varies exponentially with applied voltage. This device has good ability for limiting the power-follow current which tends to flow from the associated energized conductor to ground when the device sparks over in response to a predetermined voltage, but has serious practical limitations as to surge-current carrying capacity and further, the voltage drop across the resistance material is of course impressed upon the associated apparatus the device is intended to protect.

The second type is commonly called an "expulsion" type arrester, which is virtually the converse of the "valve" type, having relatively poor power-follow characteristics but practically unlimited surge-current ability with substantially no accompanying voltage drop impressed upon the apparatus protected. The desirability of the provision of an excess-voltage protective device having the surge-current carrying capacity inherent in the "expulsion" device along with the property of restricting the power-follow current to an insignificant amount is quite apparent, and the present invention relates specifically to such a device.

Many forms of lightning protective devices have been used, usually classified as "expulsion" arresters, which embody materials of construction similar to those found to be acceptable for use in the present invention.

Usually such devices depend for their operation upon (1) the establishment of a follow-current arc following the precursory discharge spark and (2) the evolution from the adjacent insulating material of copious quantities of arc-extinguishing gases to provide a relatively cool and de-ionizing environment for quenching the hot and therefore conducting arc-sustaining gases to effect arc extinguishment and interruption of the follow-current. Such a procedure necessarily consumes the materials of which the arc chamber is constructed, and the useful life of the device is a function of both the number of operations and the current available for contributing to the intensity of the arc.

Arc chambers of the devices mentioned generally consist of a filler member partially filling the hollow of an associated tube, the material of the filler and tube being formed of some gas-evolving material, such as hard fiber. Conventionally-used fillers have been either smooth-surfaced cylindrical members or cylindrical members provided with helical or circumferential grooves.

The undesirability of constructions which permit the flow of power-follow current has long been recognized, and some attempts have been made to solve this problem by means of some sort of a filler-tube construction having the ability to discharge the transient surge currents without initiating a dynamoelectric follow-current arc. These attempts are generally exemplified by a filler-tube arrangement in which a smooth cylindrical plug-type filler is driven tightly into the tube, depending upon the surge voltage to cause a discharge spark to pass through an extremely restricted path between the inner surface of the tube and the outer surface of the filler. There being no compensatory adjusting mechanism in such a construction the effectiveness of its operation is dependent upon a definite and critical precision of fit of the filler plug in the tube.

Since known insulating materials having suitable properties to withstand the mechanical stresses and temperatures attending operation and particularly that material most suitable, namely—vulcanized fiber—are subject to important changes in dimensions with changing humidity and temperature, the vital precise clearance between the members of the arcing chamber is more apt to be absent than not. Slightly too much clearance results in serious grooving by the follow-current arc initiated by a discharge spark, because this construction is a single discharge path device, and in the absence of any alternate path, no forces are brought into action to move or spread the discharge spark from the initial path. On the other hand, if adjacent surfaces of the filler and tube are pressed together so that all of the air is squeezed out of the space therebetween, then no air gap is available for the passage of the discharge spark, and the device will fail by external flashover, or alternately be protected by failure of the associated apparatus it is intended to protect.

The principal object of the present invention is the provision of an excess-voltage protective device, embodying a pair of separate paths, which is capable of (a) discharging a widely varying range of transient surge-currents, such surge-currents lasting only for a very small fraction of a cycle of a 60 cycle power system and (b) restraining the flow of power-follow current, which in conventional devices continues to flow from the 60-cycle power line through the path initiated by the discharge spark, to such an extent that the operation of the device causes no visible erosion of the insulating members bounding the discharge path, or indication of follow-current or 60 cycle voltage disturbance on the trace when the electrical operation of the device is recorded by a magnetic oscillograph.

Another object of the invention resides in the provision of means for compensating for dimensional changes of the insulating members bounding the discharge path, so that the ability of device to discharge surges without accepting follow-current as above described is unaffected by either weather conditions or discharge sparks.

Another object of the invention resides in the provision of a novel filler construction which renders the device capable of discharging high-current surge sparks without eroding a groove at the path followed by the surge current, such a filler being provided with a helical furrow forming a relatively narrow channel extending from one end of the filler to the other, with an intervening land between the convolutions of the narrow channel which is substantially wider than the channel.

Another object is an improved plural-part filler construction divided near its midpoint along abutting oblique end surfaces of the parts, which construction, in cooperation with resilient means urging the respective parts of the filler to mutual engagement at the abutting beveled ends, provides an essential unbalance of pressure along the longitudinal adjacent surfaces of the filler and the tube into which it is fitted, thereby assuring presence of the necessary chain of air molecules to provide a relatively short air gap along the internal smooth surface of the tube and between conducting electrodes positioned at the respective ends thereof.

Another object is the provision of a novel mechanical reinforcement construction associated with the tubular structure which effectively reinforces the closed end thereof, and cooperates electrically with the normally grounded electrode at the vented end of tubular structure to initiate formation of ionized streamers extending from the vented-end conducting electrode to thereby substantially reduce the sparkover voltage of the device, and so increase its ability to protect associated apparatus. Heretofore, devices of this kind in which the tube reinforcement has also functioned as an electrostatic flux control member have failed to provide any means for reinforcing the closed end of the tube at which maximum internal pressure is expressed when the device operates. Contrary to the conventional arrangements, my invention herein provides a construction eliminating the necessity for connecting the reinforcement member to the grounded and vented electrode, and thereby provides a structure having superior strength properties not found in presently available devices of this character.

With the foregoing and other objects in view which will appear from the following detailed description, my invention resides in the novel form, combination and construction of the components.

The invention is illustrated in the accompanying drawing, the single figure of which is a longitudinal sectional view of a device embodying the invention.

The particular embodiment shown in the drawing is an excess-voltage protective device having a discharge chamber formed by a tube or tubular structure 30 of a suitable insulating material, for example, hard fiber. An upper electrode 16 is threaded into the upper end of the tube 30, here shown as an inverted cup-shaped metal member, and the metal stud 12 threadedly extends coaxially downward through the top portion and into the hollow of the cup-shaped upper electrode 16. In somewhat similar manner, a lower metal electrode 24 extends upwardly from the bottom end of the tube 30 in threaded engagement therewith, the upper end of the lower electrode 24 being spaced from the lower end of the upper electrode 16 to form a spark gap or a discharge spark within the tube 30. A lower terminal stud 29 extends coaxially upwardly in threaded engagement with the center portion of the lower electrode member 24, and the vents 25 provide for escape of gas which may be expanded or generated within the tube 30. The terminal stud 29 is shielded by means of the metal sleeve 26, the latter being held in place by the nut 27 of the terminal stud 29. An additional nut 28 is provided on the threaded stud 29 for convenience in connecting a ground wire thereto, and for use in mounting the device, if desired.

Within the tubular structure 30 is fitted in tight slip-frictional engagement with the inner wall thereof a filler of insulating material, such as hard fiber, the filler comprising an upper end portion 19, and a lower end portion 20. The lower end of the filler 20 is fitted with a metal ferrule 21, for supporting the filler on the lower electrode member 24, and a helical spring 17 is centrally positioned between the upper electrode 16 and the upper end of the filler part 19, being arranged to continuously urge the filler in downward direction against the lower electrode 24.

The filler is severed between its respective ends along an oblique plane indicated at the numeral 34 to divide the filler into its two separate parts. The angle of the bevel is preferably small with respect to the longitudinal axis of the filler, so that the wedging effected by the resilient endwise urging of the upper portion 19 against the lower portion 20 will be effective to unbalance the pressure of the respective filler parts against the inner surface of the tube 30 along diametrically disposed vertical lines, thereby providing the shorter discharge path from one electrode to the other along the lines of lowest contact pressure. The compensation for change in dimensions just described is essential, because if the filler is too tightly fitted, the protective ability of the device is destroyed, and if too loose, power-follow current will be established in the path of the discharge spark, as in the conventional "expulsion" type of arrester.

A narrow channel 22, preferably in the form of a furrow generally triangular in section and having a flat top and an outwardly and downwardly sloping side, is cut helically in the surface of the filler from its upper to its lower end, thereby providing a relatively long discharge path of relatively less restriction in parallel with the shorter path described above. For best operating results, the channel 22 should be of substantially less width than the land 23 between the convolutions of the channel, and the pitch of the spiral channel should be such that any gas moving therein will move transversely with respect to the shorter discharge path.

To assure proper operation of the device in connection with a 60 cycle alternating current, the R.M.S. voltage should preferably not exceed 1800 times the length in inches of the shorter path, and the length of the longer spiral path should be at least 2.4 times the length of the shorter path. As a further important consideration, the length of the lands should never be less than the width of the spiral channel, as measured vertically along the inner surface of the tube. As an illustration of the important related dimensions of a device meeting the requirements of the principal object as set forth above, a device successfully operated in connection with a 60 cycle 8000 volt R.M.S. circuit was constructed having the direct shorter path 5 inches in length, the longer path 12 inches in length, a filler diameter of one inch, the longer path being formed by a flat-topped furrow $\frac{3}{16}''$ deep and $\frac{1}{4}''$ wide, the pitch of the spiral defining the longer path $\frac{15}{16}''$, and the bevel dividing the filler at 30 degrees with the axis of the filler. The drawing illustrates such a construction in approximately actual size.

The upper and closed end of the tubular structure 30 is reinforced by snugly fitting thereover a cup-shaped steel reinforcing member 15, the latter extending downwardly for such a distance that the spacing between the upper electrode 16 and the lower electrode 24 is greater than the spacing between the latter and the lower end of the reinforcing member 15. To assure that sparkover between the electrodes 24 and 16 will occur inside of the spark chamber 30, the outer surface of the lower end portion of the latter is uniformly tapered, and thereover is tightly fitted a plastic sleeve 31 of an insulating material such as a dielectric grade of polyethylene. The sleeve 31 is held firmly under pressure by its contact at its lower end surface with the outwardly extending flange portion of the lower electrode 24, and is extended upwardly beyond the lower end of the tube reinforcing member 16 and thereover to an elevation near the upper end of the tube 30. As an additional means of increasing the insulation between the reinforcing member 15 and the lower electrode 24, a silicone grease or a thin coat of dielectric adhesive (not shown) may be applied between the plastic sleeve 31 and the lower end of the tube 30.

A housing 32, of porcelain or similar material, is provided to house the elements of the discharge chamber, being supported at its lower end by the outwardly extended flange of the lower electrode 24, and positioned and covered at its upper end by the metal cover 14, being held in position by the nut 13 of the stud 12, the latter extending through a centrally-positioned opening in the cover 14. Gaskets 18 and 33 may be provided to seal the points at the respective ends of the housing 32.

In operation, the upper terminal 12 is connected, through an external series spark gap 11, to a terminal of a protected device 10 or to a conductor therewith associated, the lower terminal 29 being connected to ground. Upon the occurrence of a predetermined excess voltage, such as might be caused by lightning, the gap 11 and the internal shorter gap between the electrodes 16 and 24 sparks over along the internal surface of the tube 30, discharging the surge to ground. The resistance of the pair of discharge paths is maintained at such a high value immediately following the discharge spark that the power-line voltage is unable to maintain continued flow of power-follow current across the gap 11, and no follow-current occurs regardless of the polarity or instantaneous voltage of the connected conductor at the time of discharge.

While I am not certain as to the correct explanation for the improved results I obtain, it seems likely that the heat from the discharge or lightning spark causes a sudden transverse movement of air and perhaps some water vapor from the fiber members so that the discharge spark is so moved, cooled and elongated by the movement of expanded gases as to prevent the necessary reduction in arc-arresting resistance to enable a follow-current arc to be kindled. Since there is no apparent thermal degradation of the fiber members, no large volume of decomposition gases are evolved, such as is usual in conventional types of devices. The absence of the evolution of large quantities of incandescent gases may be noted by observing the device under operating conditions. The initial discharge spark follows the highly but least restricted path as determined by the relation of the filler parts to the inner surface of the tube as established by the wedging action, so that any movement of the discharge spark as it may be driven by the moving gas is necessarily into an even more restricted or perhaps fully blocked path, which of course has a resistance approaching the puncture strength of the insulating material.

It will be apparent from the foregoing dsecription that modifications and variations of the present invention are possible. It is, therefore, to be understood that the invention is not limited in its application to all of the details of construction and arrangement of the parts specifically described or illustrated, and that, within the scope of the appended claims, it may be practiced otherwise than as specifically described or illustrated.

I claim:

1. An excess-voltage protective device subject to follow-current in response to a precursory discharge spark therein, comprising a hollow insulator body forming a housing for a plurality of normally insulated conducting electrodes positioned in spaced relationship to provide an air gap, and a dielectric structure formed of insulating material and confining said gap, said dielectric structure including a tubular structure vented at one end, said tubular structure having a smooth inner surface, and an elongated filler of insulating material tightly fitted therein between said electrodes, said filler member comprising at least two parts disposed in beveled end-to-end relationship and having a convoluted surface including a furrow extending helically around the filler member, the width of the land between adjacent convolutions of said furrow being at least equal to the width of the furrow, said convoluted surface cooperating with said smooth surface to define one of a pair of separate paths bridging the confined air gap, the other of said pair extending along said inner surface and forming a shorter path, both of said paths offering a composite arc arresting resistance of sufficient magnitude to preclude the formation of any follow-current arc within the device following sparkover of said shorter path.

2. An excess-voltage protective device comprising a tubular structure of insulating material, spaced electrode members disposed at the respective ends of said tubular structure, at least one of said electrode members extending into said tubular structure and at least one end of said tubular structure being vented, and an elongated filler member of insulating material fitted within said tubular structure between said electrode members, said filler member having a furrow extending helically [from one electrode member to the other electrode member], *along the surface thereof,* the width of the land between adjacent convolutions of said furrow being substantially greater than the width of said furrow.

3. An excess-voltage protective device comprising a tubular structure of insulating material, spaced electrode members disposed at the respective ends of said tubular structure, at least one of said electrode members extending into said tubular structure and at least one end of said tubular structure being vented, and a segmented filler member snugly fitted within said tubular structure between said electrode members, said filler member having a furrow extending helically [from one electrode member to the other electrode member], *along the surface thereof,* the width of the land between adjacent convolutions of said furrow being at least equal to the width of said furrow, and the segments of said filler abutting in beveled-end engagement.

4. An excess-voltage protective device comprising a tubular structure of insulating material, spaced electrode members disposed at the respective ends of said tubular structure, at least one of said electrode members extending into said tubular structure and at least one end of said tubular structure being vented, a segmented filler member tightly fitted within said tubular structure between said electrode members, said filler member having a furrow extending helically [from one electrode member to the other electrode member], *along the surface thereof,* the width of the land between adjacent convolutions of said furrow being substantially greater than the width of said furrow, the segments of said filler extending in end-to-end relationship and engaging one another along matching beveled-end surfaces, and resilient means urging said segments to engagement.

5. An excess-voltage protective device comprising a tubular insulating structure, normally insulated conducting electrodes disposed at the respective ends of said tubular structure, at least one of said electrodes extending partway into said tubular structure to assure that sparkover between said electrodes results in a discharge spark within said tubular structure, an elongated filler tightly fitted into said tubular structure and positioned between said electrodes, and structural means for assuring that the voltage required to cause a discharge spark between said electrodes is not substantially increased due to the presence of said tightly-fitted filler therebetween, said means including the division between said electrodes of said filler into two parts along an oblique plane, and resilient means longitudinally urging said parts in abutting end-to-end engagement.

References Cited in the file of this patent or the original patent

UNITED STATES PATENTS

| | | |
|---|---|---|
| 2,591,370 | Nelson et al. | Apr. 1, 1952 |
| 2,673,941 | De Val | Mar. 30, 1954 |
| 2,677,072 | De Val | Apr. 27, 1954 |
| 2,683,235 | Roloson | July 6, 1954 |
| 2,691,742 | De Val | Oct. 12, 1954 |